United States Patent [19]

Koshiishi et al.

[11] Patent Number: 4,602,969
[45] Date of Patent: Jul. 29, 1986

[54] METHOD FOR ANNEALING A CORE BLANK USED IN ELECTRIC MACHINERY AND DEVICES

[75] Inventors: Hiromichi Koshiishi, Tokyo; Sigeki Eguchi, Kitakyushu; Hisahumi Sakamoto, Kitakyushu; Hisayoshi Kuramasu, Kitakyushu, all of Japan

[73] Assignees: Nippon Steel Corporation; Mitsui High Tech, Inc., both of Tokyo, Japan

[21] Appl. No.: 788,097

[22] Filed: Oct. 16, 1985

Related U.S. Application Data

[63] Continuation of Ser. No. 615,331, May 30, 1984, abandoned.

[30] Foreign Application Priority Data

May 31, 1983 [JP] Japan .................................. 58-96801

[51] Int. Cl.$^4$ .............................................. C21D 1/42
[52] U.S. Cl. .................................... 148/121; 148/154; 219/10.41; 219/10.57
[58] Field of Search ............... 148/121, 112, 154, 128, 148/150, 126; 219/10.41, 10.43, 10.57

[56] References Cited

U.S. PATENT DOCUMENTS

| | | | |
|---|---|---|---|
| 3,932,205 | 1/1976 | Lindholm | 148/108 |
| 4,281,234 | 7/1981 | Dohogne | 219/10.43 |
| 4,355,221 | 10/1982 | Lin | 219/10.43 |

Primary Examiner—Christopher W. Brody
Attorney, Agent, or Firm—Kenyon & Kenyon

[57] ABSTRACT

The present invention relates to a method for annealing a core blank of a transformer or the like so as to relieve the stress generated in the electrical steel sheet sections due to blanking.

The present invention is an improvement over the conventional resistance or gas-heating method in the light of heating efficiency and time and is characterized by induction-heating a core blank at a power input range of from 0.5 to 3 kW/kg of the core blank. This range attains a small variation in the shape of a core blank due to induction-heating.

2 Claims, 3 Drawing Figures

METHOD FOR ANNEALING A CORE BLANK USED IN ELECTRIC MACHINERY AND DEVICES

This application is a continuation, of application Ser. No. 615,331, filed May 30, 1984, now abandoned.

BACKGROUND OF THE INVENTION

1. Field of the Invention

The present invention relates to a method for heating, particularly induction-heating, electrical steel sheets which are blanked to provide the shape of core sections of an electric motor, a transformer, or the like. Such electric motor, transformer, and the like are hereinafter referred to as electric machinery and devices. The electrical steel sheets are blanked into the shape of the core sections of electric machinery and devices by means of a shearing tool or a punch and are then laminated in the shape of a core, followed by, for example, caulking or welding, to provide them with a shape stability. The so-blanked and so-laminated core sections are hereinafter referred to as a core blank.

2. Descriptin of the Prior Art

Electrical steel sheets, such as stipulated in JIS C 2552 and 2554, are blanked to provide a core blank. Since the blanking strain induced in the core blank increases the watt loss of a core, the core blank is occasionally annealed for the purpose of relieving the strain and improving the magnetic properties of the core blank. Conventionally, the annealing is carried out by radiation-heating with an electric resistance-heat generation or gas combustion at a soaking temperature of 750° C. for two hours. In order to attain the soaking temperature of 750° C., a temperature elevation of 5 hours is necessary and then soaking-cooling for a period of 12 hours is carried out. The total heating time therefore amounts to 12 hours, which is very long. In addition, the thermal efficiency of the conventional annealing method is low.

SUMMARY OF THE INVENTION

It is an object of the present invention to provide a method for annealing a core blank, whereby the thermal efficiency is enhanced, the stress-relief annealing of the core blank is carried out in a short period of time, and the magnetic properties of the core blank are improved.

In accordance with the objects of the present invention, there is provided a method for annealing a core blank, characterized in that the core blank is induction-heated at a controlled power input in a range of from 0.5 to 3 kW/kg thereof.

DESCRIPTION OF THE PREFERRED EMBODIMENTS

In the induction-heating of the core blank, an eddy current is induced within the core blank and generates a Joule heat, due to which the heat for heating the core blank is generated in the core blank itself. As a result, rapid heating of the core blank is attained.

The eddy current in the core blank which is subjected to induction-heating tends to locally distribute or concentrate on the surface of the core blank due to the skin effect of the induction-heating coil. The depth from the surface of a heated article to where the current density is decreased to $1/\epsilon$ times the current density at the surface is referred to as the penetration depth S and is expressed by the following formula, the above "$\epsilon$" being in the base of the natural logarithm:

$$S = \frac{1}{2\pi \sqrt{\mu_s \cdot K \cdot f \cdot 10^9}} \text{ (cm)},$$

wherein $\mu_s$ is the specific permeability of the heated article, k is the current conductivity of the heated article, and f is the frequency of the current.

The penetration depth S is lessened with an increase in the frequency, with the result that the difference between the inner and outer temperatures of the heated article is increased.

The present inventors carried out the following experiments on the induction-heating of core blanks.

The core blanks were induction-heated with a current of varying frequency. It was discovered that no remarkable temperature difference was generated in the core blanks at a frequency range of from 350 to 800 Hz.

The core blanks were induction-heated while varying the power input. The elevation time of temperature to the annealing temperature is dependent upon the power input and is approximately 20 minutes when the power input is 0.5 kw per kg of the core blank. The elevation time of temperature to the annealing temperature is therefore 20 minutes or less. When the power input was increased, the temperature-elevating time, which is required for elevating the lowest-temperature portion of the core blanks to 750° C., was shortened, and, hence, the temperature-elevation could be shortened. But the temperature difference between the internal and external portions of the core blanks was increased, and the shape of the core sections was impaired. It was, therefore, revealed that in order to keep the shape of the core blanks within an acceptable range, the power input must be limited.

A preferred method according to the present invention comprises the steps of:

preparing an induction-heating coil;

disposing the core blank within the induction-heating coil;

energizing the induction-heating coil and generating a current having a frequency of from 350 to 800 Hz so as to heat the core blank up to an annealing temperature within a time period of 20 minutes or less;

maintaining the annealing temperature for a time period sufficient to restore the magnetic properties of the electrical steel sheet which deteriorate due to blanking;

cooling the core blank from the annealing temperature down to an ambient temperature;

withdrawing the cooled core blank from the induction-heating coil; and controlling the power input from the induction-heating coil to the core blank during the energizing and maintaining steps to a level of from 0.5 to 3 kW per kg of the core blank.

The annealing can not only restore the deteriorated magnetic properties but can also improve the magnetic properties as compared to those before blanking, in the case of a low-grade electrical steel sheet, since the grains of this sheet can grow during the annealing.

BRIEF DESCRIPTION OF THE DRAWINGS

FIG. 1 shows the results of the experiment carried out by the present inventors. In order to produce the core blank 1, an electrical steel sheet was blanked into core sections. Several of the core sections were caulked simultaneously with the blanking, and the other core sections were welded after the caulking. Caulked core blanks and welded core blanks were thus produced, each having a height of 50 mm. They were subjected to induction-heating while varying the power input and then the list distance (Δ) at both sides of the core blanks was measured.

A list distance (Δ) of 0.2 mm or less is usually acceptable.

Figure 1:
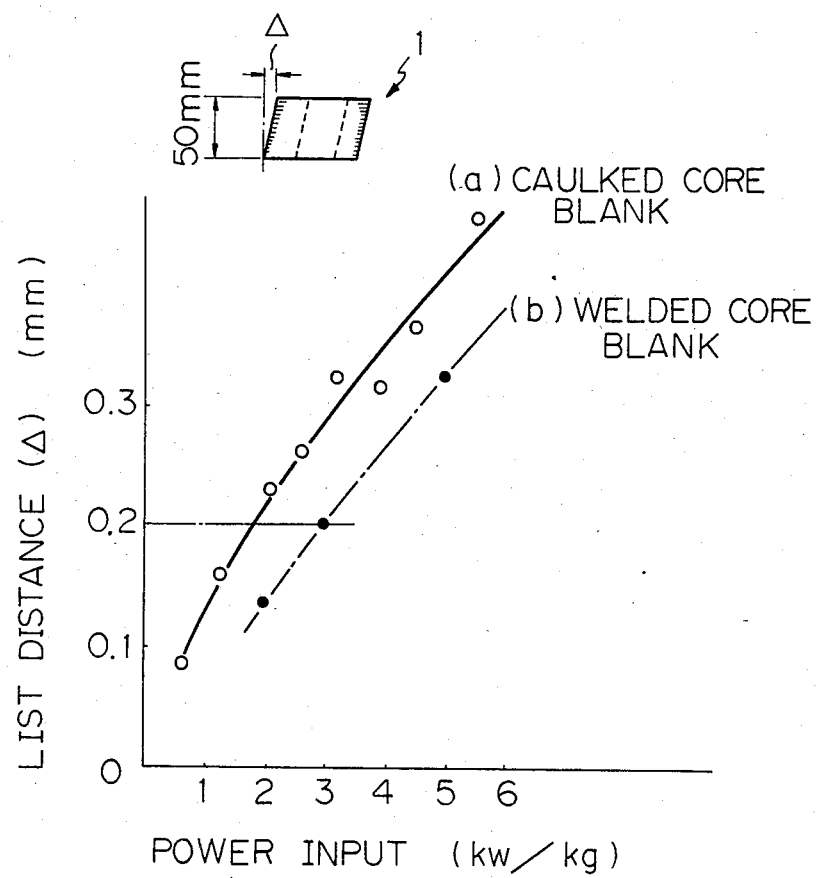
FIG. 1 shows the relationship between the power input and the list distance of the core sections.

As is apparent from FIG. 1, power inputs of 2 kW/kg or less and 3 kW/kg or less make the list distance (Δ) acceptable with regard to the caulked core blank and welded core blank, respectively.

In addition to the list distance (Δ), the heating efficiency, the temperature-elevating rate, and the magnetic properties of the core blanks were measured. It was discovered that a power input of from 0.5 to 3 kW/kg of the core blank is preferable in the light of the list distance, the heating efficiency, the magnetic properties, and the like.

Figure 2:
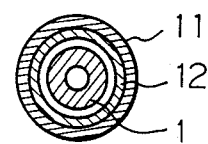
FIG. 2 shows a cross-sectional view of a vertical-type induction-heating coil.

Referring to FIG. 2, a core blank 1 is placed within an induction-heating coil 11 provided with an inner tube 12 made of quartz or ceramics for sealing the protective gas within the induction-heating coil. Although only one core blank 1 is shown in FIG. 2, a plurality of core blanks are placed upon one another vertically in the induction-heating coil 1.

Figure 3:
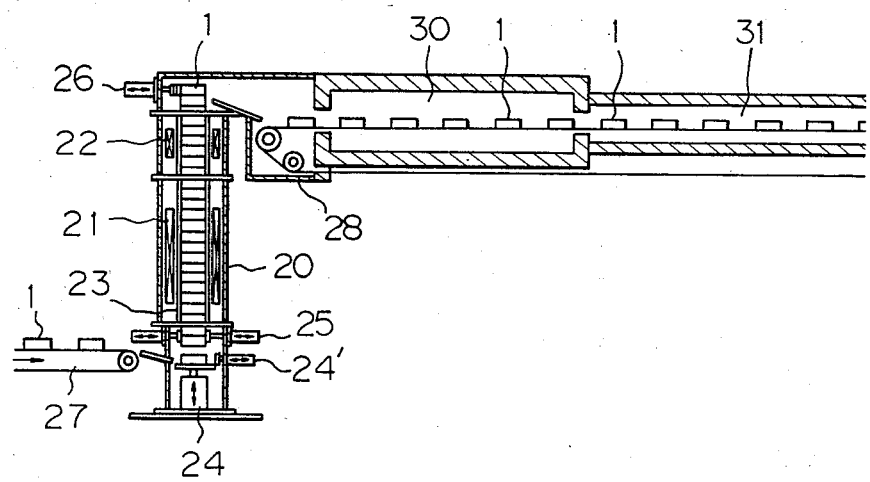
FIG. 3 shows an induction-annealing plant.

Referring to FIG. 3, a primary induction-heating coil 21 and a secondary induction-heating coil 22 are disposed vertically within a vertical casing 20. An inner tube 23 is positioned concentrically within the vertical casing 20 and seals the protective atmosphere.

The core blanks 1 are transferred by a conveyor 27 to a bottom portion of the vertical casing 20, where a lifting device 24 is located to receive the core blank 1, one by one, from the conveyor 27. A positioning means 24' of the lifting device 24 adjusts the horizontal position of a core blank 1, thereby concentrically positioning the core blank 1 relative to the vertical axis of the primary induction coil 21. The lifting device 24 then pushes the core blank 1 vertically upward until it is brought into contact with the core blank 1 stationarily held by the stopper device 25, this contact being detected by a limit switch or sensor (not shown). The stopper device 25 is then released to make the core blank 1 held thereby liftable, and the lifting device 24 is again operated to lift the core blank 1 held by it. The lifting device 24 is stopped when it arrives at the position of the stopper device 25, which position is detected by the limit switch or sensor. The so-lifted core blank 1 is stationarily held by the stopper device 25, and the lifting device 24 is lowered, before the lifting, to a position when it is ready for receiving a core blank 1 from the conveyor 27.

The primary induction-heating coil 21 and the secondary induction-heating coil 22 are vertically arranged so that an appropriate holding time is attained during the transfer of the core blanks 1 therethrough. At the outlet side of the secondary induction-heating coil 22, a displacing device 26 is located to displace the core blank 1, which is positioned at the top of the core blank column, onto a conveyor 28. The core blanks 1 on the conveyor 28 are conveyed through the soaking furnace 30 and the cooling furnace.

The present invention is now explained with reference to an example.

EXAMPLE

Caulked and welded core blanks were induction-heated to 750° C. at the frequency, the power input, and the temperature-elevating rate given in the following table.

TABLE 1

| Test No. | Frequency (Hz) | Power Input (kW/kg) | Temperature Elevation Time (minutes) | Temperature Difference Between Inner and Outer Parts of Core Blank (°C.) | Shape* | Magnetic Properties † | Power Consumption (KWH/kg) |
|---|---|---|---|---|---|---|---|
| 1 (Invention) | 700 | 0.8 | 15 | 16 | ⊙ | ○ | 0.20 |
| 2 (Invention) | 450 | 2.7 | 4 | 28 | ○** ○†† | ○ | 0.18 |
| 3 (Comparative) | 700 | 4.7 | 3 | 48 | x | ○ | 0.21 |

*Shape in terms of List Distance (mm): ⊙ 0.2≧, ○ 0.2~0.3, x 0.3≦
† Magnetic Properties: ○: Equivalent to those obtained by a conventional stress-relief annealing at 750° C. for 2 hours.
**Welded core blank
† †: Caulked core blank The power consumption was approximately 0.2 kWH/kg and achieved a considerable saving of electricity as compared with a conventional electric-resistance heating furnace, in which approximately 0.40 kWH/kg of power was consumed.

In test No. 1 and test No. 2 (in the case of the welded core blank), excellent magnetic properties, a small list distance (Δ), a small temperature difference, and a short temperature elevating-time were attained.

We claim:

1. A method for annealing a core blank comprising blanked and laminated sections of an electrical steel sheet, comprising the steps of:
   preparing an induction-heating coil;
   disposing said core blank within the induction-heating coil;
   energizing said induction-heating coil and generating a current having a frequency sufficient to head said core blank up to an annealing temperature within a time period of 20 minutes or less;
   maintaining said annealing temperature for a time period sufficient to restore the magnetic properties of the electrical steel sheet which deteriorate due to blanking;
   cooling said core blank from said annealing temperature down to an ambient temperature;

withdrawing the cooled core blank from said induction-heating coil;
controlling the power input from said induction coil to said core blank during said energizing and maintaining steps to a level of from 0.5 to 3 kW per kg of said core blank.

2. A method as recited in claim 1 wherein said frequency is from 350 to 800 Hz.

* * * * *